United States Patent [19]

Lohrengel

[11] Patent Number: 4,692,482
[45] Date of Patent: Sep. 8, 1987

[54] METHOD OF CONCENTRATING POLYPHENYLENE ETHER SOLUTIONS

[75] Inventor: Gregor Lohrengel, Essen, Fed. Rep. of Germany

[73] Assignee: Huls Aktiengesellschaft, Marl, Fed. Rep. of Germany

[21] Appl. No.: 921,463

[22] Filed: Oct. 22, 1986

[30] Foreign Application Priority Data

Jan. 14, 1986 [DE] Fed. Rep. of Germany ....... 3600754

[51] Int. Cl.$^4$ ................... C08J 3/00; C08L 71/04
[52] U.S. Cl. ................... 523/340; 523/343; 528/501; 528/214
[58] Field of Search ............... 525/905; 523/340, 343; 528/501, 214, 215; 524/768, 841

[56] References Cited

U.S. PATENT DOCUMENTS 3,036,057  5/1962  Wallace ........................... 528/484
3,470,070  8/1969  Heckart .......................... 203/88
4,414,341 11/1983  Williams ......................... 523/340

Primary Examiner—Paul R. Michl
Assistant Examiner—A. L. Fugo
Attorney, Agent, or Firm—Oblon, Fisher, Spivak, McClelland, & Maier

[57] ABSTRACT

The invention relates to a two-stage method for concentrating solutions of polyphenylene ethers (5–15 wt. %) in organic solvents, wherein the first stage is operated with recycle and the second stage is operated in a single pass with no recycle side streams, to produce an accurately adjusted final concentration of between 50 and 60 wt. %.

6 Claims, 2 Drawing Figures

METHOD OF CONCENTRATING POLYPHENYLENE ETHER SOLUTIONS

BACKGROUND OF THE INVENTION

1. Field of the Invention

The oxidative coupling reaction of 2,6-di-orthosubstituted phenols results in solutions of polyphenylene ethers (PPEs) in organic solvents. The concentration of the solution obtained varies to a certain degree, depending on the composition of the reaction mixture and on the reaction conditions.

2. Discussion of the Background

According to the current state of the art, PPE polymers are no longer precipitated out by adding a so-called anti-solvent, but are recovered by concentrating the solution. Other polymers, e.g., polystyrenes, and additives, may be optionally added in this step. It is difficult to carry out the concentration process because of the difficulty of removing residual amounts of solvents from the highly viscous solutions. If high temperatures are applied over fairly long periods, undesirable product damage occurs.

Indeed, the reasons for producing PPE solutions of constant concentration is to avoid having to subject the polymer to excessive thermal stressing in subsequent processing steps.

Various methods are known for concentrating solutions of organic plastics. For example, a flash evaporation stage may be provided and can be operated as a direct flow-through operation or in recycle. The direct or single-pass operation has the disadvantage that it accentuates variations in the concentration of the initial solution which are reflected in the concentrated solutions produced. The recycle operation requires temperatures which exceed the boiling point of the solvent at normal pressure by more than 40° C., due to the high viscosity of the PPE solutions. The long residence time of the product in the evaporator is also disadvantageous.

In German OS No. 31 31 440, a method is described in which other polymers, e.g., styrene polymers, are added to solutions of PPE, and the resulting mixtures are evaporated in a multistage process. A disadvantage of this process is that substantial amounts of solvent must be removed from the polymer mixture, thereby requiring apparatus of large dimensions.

The methods of German OS No. 33 15 802 and OS No. 33 15 803, which are improvements over the method of German OS No. 31 31 440, comprise concentrating dilute PPE solutions to at least 60% in an evaporation process, and then processing the concentrate further with addition of plastic additives and/or melts of other polymers. It is emphasized (see OS No. 33 15 802, page 8, line 25) that it is advantageous to carry out the first evaporation process in a single stage, regardless of whether the PPE solutions:

(i) are heated under pressure in a heat exchanger and then are depressurized;

(ii) are fed to a zonewise heatable dynamic thin layer evaporator;

(iii) are concentrated in a heatable tube assembly evaporator; or (iv) are concentrated in a zonewise heatable falling film evaporator.

All the methods described above have the disadvantage that they either expose the PPE solution to excess thermal stressing or they produce substantial variations in the concentrations of the concentrated PPE solutions when presented with variations in concentration of the dilute starting solutions.

SUMMARY OF THE INVENTION

Accordingly, the object of the present invention is to provide a method for concentrating PPE solutions without exposing them to excessive thermal stress.

A further object of the invention is to provide a method for concentrating PPE solutions which produces a uniformly concentrated PPE solution from dilute starting solutions having various concentrations.

These objects and other objects which will become apparent from the following specification have been achieved by the surprisingly gentle method of the present invention in which one can concentrate dilute PPE solutions (5–15%) having concentrations which vary over time, to produce concentrated solutions (50–60%), by a two-stage process.

In a first flash evaporation stage with recycle, the concentration increases to 20–35%, and in a second direct flow trough flash evaporation stage without recycle, the desired final concentration in the range of 50–60% is reached.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

The reference abbreviations used in the Figures are as follows:

B1—Reservoir
B2—Flash container I (operating content=10 kg).
B3—Condensate receiver II.
B4—Flash container II.
B5—Condensate receiver II.
B6—Final product container.
W1—Heat exchanger I (operating content=3.5 kg).
W2—Heat exchanger II (operating content=1.2 kg).
V1, V2, V3—Valves.
K1, K2—Containers.

DETAILED DESCRIPTION OF THE PREFERRED EMBODIMENTS

The starting materials are PPE solutions which are produced after the PPE polycondensation is interrupted. These solutions no longer contain catalyst. Typically, they are comprised of a PPE, i.e., a polymer of a phenol wherein the phenol is at least ortho substituted. Typically employed phenol monomers are described, for example, in German OS No. 32 24 692, OS No. 32 24 691, and OS No. 33 13 864. The subject of German OS No. 33 32 377 is a method of purifying PPEs.

Suitable solvents for the PPE reactions are also described in the German Patents referred to in the preceding paragraph. Toluene and toluene-methanol mixtures (with methanol content $\leq 30$ vol. %) have proven particularly advantageous.

Figure 2:
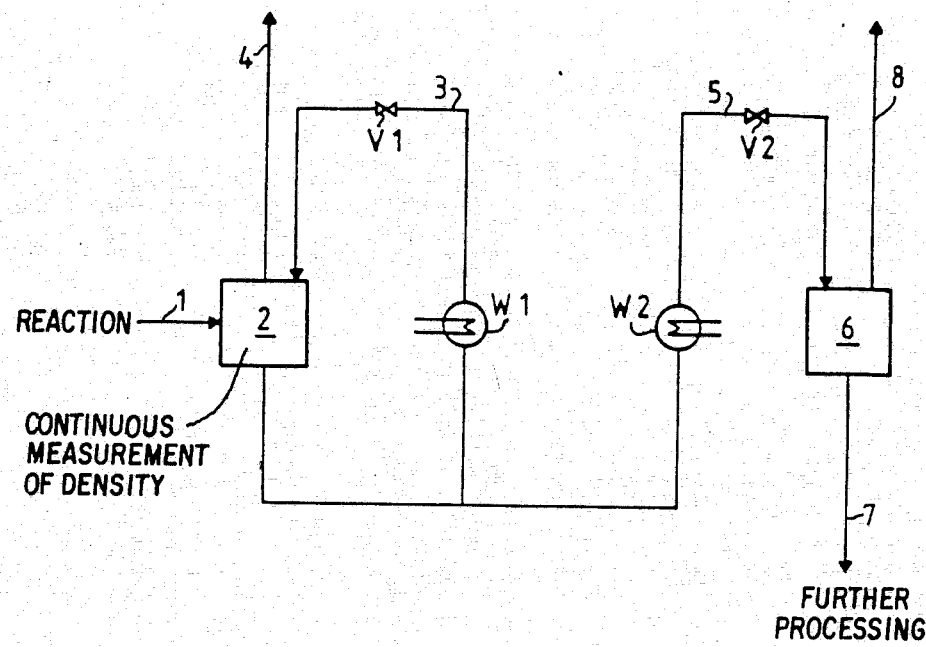
FIG. 2 is a process schematic for concentrating solutions of PPE in toluene.

The first flash evaporation stage (FIG. 2) is comprised of an evaporator 2 to which a dilute PPE solution is continuously fed. The temperature in this first stage should be at most 20° C., preferably at most 10° C., greater than the boiling point of the solvent or the solvent mixture, in order not to subject the polymer to unnecessary thermal stress. When toluenemethanol mixtures are used, the set point temperature will be, e.g., about 115° C.

The contents of the evaporator are constantly recycled via a loop including the heat exchange W1 and the flash valve V1. The temperature is kept down to about 10° C. above the solvent boiling point by adjusting the recycle quantity. The concentration of PPE is continuously monitored, e.g., via the density, and is adjusted to the desired value which is between 20 and 35 wt. %.

The solution emerging from the first stage is fed to the single-pass evaporator 6 via the heat exchanger W2 and the flash valve V2. In the second stage the desired final concentration can be accurately adjusted by controlled heating the solution to temperatures less than 100° C. in excess of the boiling point of the solvent in exchanger W2.

Other features of the invention will become apparent in the course of the following description of an exemplary embodiment which is given for illustration of the invention and is not intended to be limiting thereof.

EXAMPLES

Example 1: Two-Stage Concentrating

Figure 1:
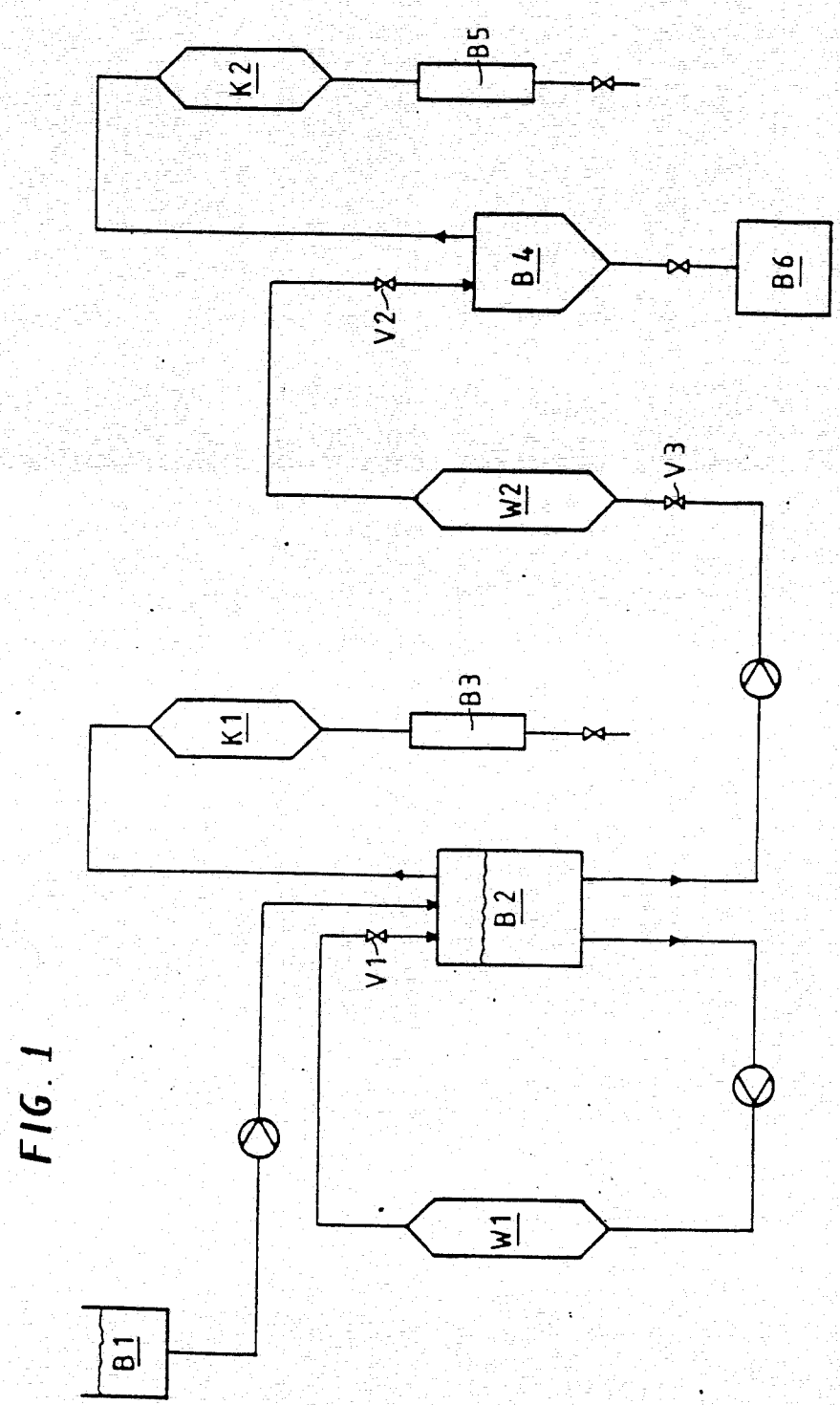
FIG. 1 illustrates a test apparatus for one- and two-stage concentrating of toluene solutions of PPE such as used in Examples 1 and A.

In the installation illustrated in FIG. 1, the first flash container B2, is fed with 24.3 kg/hr. of a 11.2 wt. % solution of PPE in toluene, and is concentrated at 112° C. to 25.6 wt. % by continuous recycle pumping via heat exchanger W1. The resulting solution is passed through heat exchanger W2 and is then flashed in container B4 at the rate of 10.6 kg/hr. A 53.7 wt. % solution of PPE is drawn off into container B6.

Comparison Example A: Single-Stage Concentrating

The container B2 is fed with 24.0 kg of a 11.2 wt. % solution of PPE in toluene, and this solution is concentrated at 180° C. to 54.1 wt. % PPE and is then passed through heat exchanger W2 (here used as a cooler) and B4, and into container B6 at 120° C.

Comparison Example B: Concentrating with Two Direct Flow through Flash Stages in Series The concentrating of a 11.4 wt. % toluene solution of PPE led to a final concentration of 53.9 wt. %, while a 10.1 wt. % starting solution resulted in a final concentration of 47.6 wt. %.

These data are evidence that concentrating in two successive single-pass flash evaporation stages leads to different final concentrations for different starting concentrations.

It can be seen from a comparison of Example 1 of the invention and Comparison Examples A and B that the product undergoes only minor thermal stressing in the inventive method. The method for the present invention also enables one to prescribe a specific PPE content in the concentrated solution.

The process comparison given in Table 1 shows that the time load on the polymer, i.e., the time at elevated temperature, with single-stage concentrating is twice that with two-stage concentrating.

TABLE 1

|  | Process Comparison | |
|---|---|---|
|  | Inventive two-stage concentrating process | One-stage concentrating process according to German OS 33 15 802 |
| Feed rate to B2, Kg/hr: | 24.3 | 24.0 |
| PPE concentration in the feed, wt. % | 11.2 | 11.2 |
| Temperature in B2, °C.: | 112 | 180 |
| Mean combined residence time of the PPE in B2 and W1, min: | 76 | 163 |
| Combined residence time of longest-residing 10% of the PPE in B2 and W1, min: | 175 | 375 |
| PPE concentration in B2, wt. % | 25.6 | 54.1 |
| Feed rate to B4, kg/hr: | 10.6 | 5.0 |
| Temperature downstream of W2, °C.: | 203 | 120 |
| Residence time in W2, min: | 7 | 15 |
| Temperature in B4 and B6, °C. | 120 | 120 |
| Input rate to B6, kg/hr: | 5.0 | 5.0 |
| PPE concentration in B6, wt. %: | 53.7 | 54.1 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for the continuous production of a polyphenylene ether solution, comprising the steps of:
   continuously feeding a dilute solution of polyphenylene ether in an organic solvent to a first flash evaporatoring stage which is processed by
   recycling a slightly concentrated polyphenylene ether solution
   feeding a portion of this slightly concentrated solution to a second flash evaporatoring stage which is processed in a direct flow through manner and
   collecting the concentrated polyphenylene ether effluent solution from said second flash evaporator.

2. The method of claim 1, wherein said concentrated polyethylene ether effluent solution comprises exactly adjusted values between about 50 and 60 wt. % polyphenylene ether.

3. The method of claim 1, wherein said dilute polyphenylene ether solution comprises about 5–15 wt. % polyphenylene ether differing with time.

4. The method of claim 1, wherein said effluent from said first flash evaporator comprises about 20–35 wt. % polyphenylene ether.

5. The method of claim 1, further comprising:
adjusting the temperature of said first flash evaporator to a temperature $\leq 20°$ C., preferably only 10° C., above the boiling point of said organic solvent at normal pressure.

6. The method of claim 1, wherein said solvent is a member selected from the group consisting of toluene and toluene/methanol mixtures, wherein said mixtures contain methanol in an amount up to 30 vol. %.

* * * * *